US005308572A

United States Patent [19]

Hackman

[11] Patent Number: 5,308,572

[45] Date of Patent: May 3, 1994

[54] METHOD FOR MANUFACTURING A REINFORCED CEMENTITIOUS STRUCTURAL MEMBER

[75] Inventor: Lloyd E. Hackman, Worthington, Ohio

[73] Assignee: Ribbon Technology Corporation, Gahanna, Ohio

[21] Appl. No.: 977,815

[22] Filed: Nov. 17, 1992

[51] Int. Cl.[5] .......................... B28B 1/00; B28B 1/24; B29C 43/02; B29C 45/00

[52] U.S. Cl. .................................... 264/510; 264/571; 264/102; 264/257; 264/258; 264/273; 264/277; 264/279; 264/279.1; 264/328.12; 264/328.2; 264/333

[58] Field of Search ............... 264/510, 571, 102, 311, 264/257, 310, 258, 333, 86, 87, 255, 256, 328.2, 279, 279.1, 273, 277, 267, 32, 328.12

[56] References Cited

U.S. PATENT DOCUMENTS

| | | | |
|---|---|---|---|
| 1,416,079 | 5/1922 | Van Houten | 162/218 |
| 2,677,955 | 5/1954 | Constantinesco | 70/50 |
| 3,410,936 | 11/1968 | Juras | 264/571 |
| 3,429,094 | 2/1969 | Romualdi | 52/659 |
| 3,604,077 | 9/1971 | Rath, Sr. | 264/328.2 X |
| 3,808,085 | 4/1974 | Givens | 161/59 |
| 3,839,521 | 10/1974 | Robinson | 264/333 X |
| 3,875,278 | 4/1975 | Brandt | 264/510 |
| 3,986,885 | 10/1976 | Lankard | 106/99 |
| 4,021,258 | 5/1977 | Uogaeshi | 264/257 X |
| 4,036,922 | 7/1977 | Ito et al. | 264/571 X |
| 4,079,108 | 3/1978 | Farfor | 264/71 |
| 4,159,361 | 6/1979 | Schupack | 428/240 |
| 4,186,536 | 2/1980 | Piazza | 264/279 X |
| 4,209,338 | 6/1980 | Magnus | 106/99 |
| 4,229,497 | 10/1980 | Piazza | 264/279 X |
| 4,242,406 | 12/1980 | Bouhnini et al. | 428/236 |
| 4,344,804 | 8/1982 | Bijen et al. | 156/42 |
| 4,366,255 | 12/1982 | Lankard | 501/95 |
| 4,373,981 | 2/1983 | Bomers et al. | 156/164 |
| 4,468,429 | 8/1984 | Takeda et al. | 264/333 X |
| 4,513,040 | 4/1985 | Lankard | 428/49 |
| 4,544,345 | 10/1985 | Buhler et al. | 264/571 X |
| 4,559,881 | 12/1985 | Lankard et al. | 109/83 |
| 4,593,627 | 6/1986 | Lankard et al. | 109/83 |
| 4,617,219 | 10/1986 | Schupack | 428/113 |
| 4,778,718 | 10/1988 | Nicholle | 428/287 |
| 4,810,569 | 3/1989 | Lehnert et al. | 428/285 |
| 4,813,472 | 3/1989 | Hackman et al. . | |
| 4,916,004 | 4/1990 | Ensminger et al. | 428/192 |
| 5,209,603 | 5/1993 | Morgan | 264/256 X |
| 5,209,968 | 5/1993 | Sweeney | 264/257 X |

FOREIGN PATENT DOCUMENTS

| | | | |
|---|---|---|---|
| 270033 | 7/1989 | Fed. Rep. of Germany | 264/328.2 |
| 22034 | 2/1982 | Japan | 264/328.2 |
| 288704 | 11/1988 | Japan | 264/328.2 |
| 61260 | 3/1990 | Japan | 264/267 |

*Primary Examiner*—Karen Aftergut
*Attorney, Agent, or Firm*—Thompson, Hine and Flory

[57] ABSTRACT

A method for manufacturing a reinforced cementitious structural member having a predetermined shape and size includes providing a mold having a cavity which corresponds to the shape and size of the member, placing at last one permeable fibrous mat into the cavity, introducing a slurry of cementitious material into the cavity so that the slurry of cementitious material fills the cavity and infiltrates and encapsulates the fibrous mat, curing the reinforced cementitious material, and separating the cured reinforced cementitious structural member from the mold.

16 Claims, 2 Drawing Sheets

METHOD FOR MANUFACTURING A REINFORCED CEMENTITIOUS STRUCTURAL MEMBER

BACKGROUND OF THE INVENTION

The present invention relates to a method for manufacturing a cementitious structural member reinforced with a fibrous mat. The structural members manufactured in accordance with the present invention are used in a variety of applications including panels, beams, columns, walls, load bearing platforms, pavement slabs, refractory shapes, receptacles, etc.

Metal fiber reinforced cementitious composites have been described in U.S. Pat. No. 3,429,094 to Romualdi, U.S. Pat. Nos. 3,986,885; 4,366,255 and 4,513,040 to Lankard, U.S. Pat. No. 4,617,219 to Schupak, U.S. Pat. No. 2,677,955 to Constantinesco, and commonly assigned copending U.S. patent application Ser. No. 07/851,647, filed Mar. 16, 1992.

Metal fiber reinforced cementitious structures are presently manufactured by placing the metal fiber reinforcing element into the mold and depositing directly on the element an appropriate amount of cementitious material necessary to completely infiltrate and encapsulate the element. Means such as vibration, ultrasonic stimulation, and the like are typically employed to insure thorough permeation of the reinforcing element by the cementitious material. The structure is then cured by any conventional means.

While the composites have been commercially successful, the methods for manufacturing the composites; particularly, the fiber-filling step are time-consuming and therefore quite expensive.

SUMMARY OF THE INVENTION

In accordance with the present invention, an improved method is provided for manufacturing metal fiber-reinforced, cementitious structures which not only improves the infiltration of the interstitial voids and the encapsulation of the reinforcing fibers, but also reduces the time necessary to accomplish the fiber-filling step. Thus, the present invention affords a much desired economic advantage over prior art methods.

It is an object of this invention in its broadest aspect to provide an improved method for manufacturing a metal fiber reinforced cementitious structure, wherein the amount of cementitious material necessary to form the cementitious structure is caused to infiltrate the interstitial voids of the metal fiber and to completely encapsulate the fiber element throughout the entire reinforced structure and to impart reinforcement in all three dimensions of the structure.

In one embodiment of the invention, the structure contains one or more sections of insulating material sandwiched between two layers of metal fiber reinforcing elements wherein the cementitious material is caused to permeate and completely fill the voids of the metal fiber reinforcing elements and also surround and encase the insulating sections.

Another embodiment of the invention provides a method for manufacturing a metal fiber reinforced cementitious structure having an arcuate shape wherein the mat is placed in an arcuate form and a cementitious slurry is pumped into the form so as to infiltrate the voids in the mat and encase the mat.

Yet another embodiment of the invention is a method for manufacturing a metal fiber reinforced cementitious structure wherein the cementitious material is introduced through multiple conduits.

DEFINITION

The term "non-woven" as used herein with respect to the metal fiber mat means that the fibers forming the mat are not systematically woven. The mat is held together by random entanglement of the fibers.

DETAILED DESCRIPTION OF THE INVENTION

Figure 1:
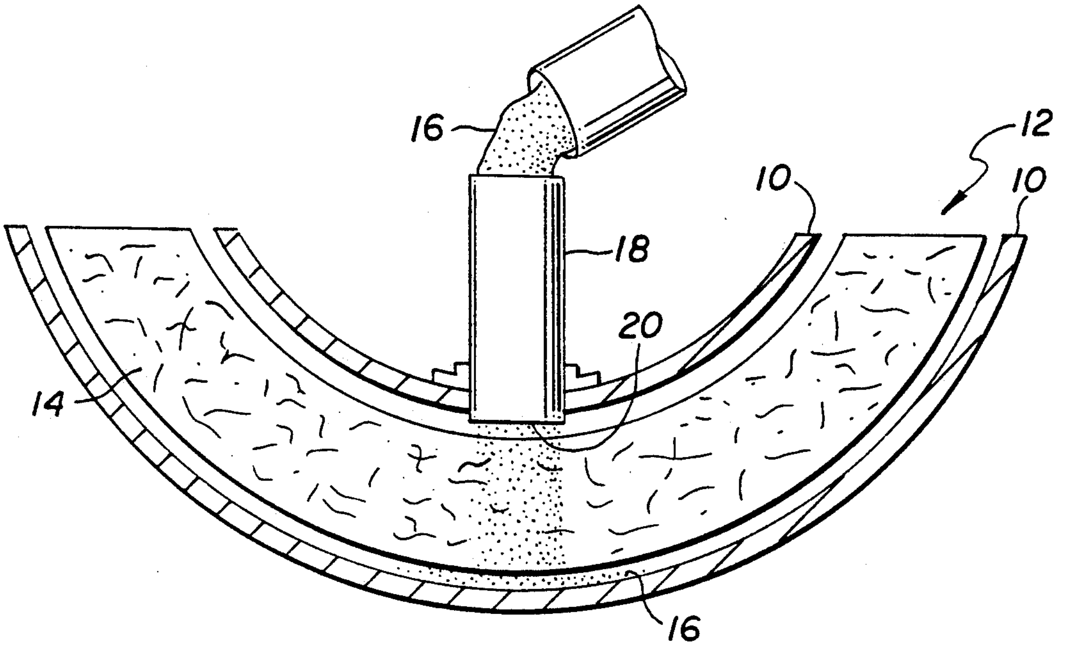
FIG. 1 is a sectional view of a molding apparatus for forming a metal fiber reinforced structure having an arcuate shape.

A new and improved method for manufacturing metal fiber reinforced cementitious structural members is illustrated in FIGS. 1–4. FIG. 1 is a sectional view of a metal fiber reinforced cementitious structural member manufactured in accordance with the invention wherein the structural member has an arcuate shape as illustrated in FIG. 1, a mold 10 has a cavity which conforms in size and shape to the desired structural member 12. In accordance with the invention, a metal fiber reinforcing element 14 is placed in the mold cavity and cementitious material 16 is introduced into the mold cavity through a stand pipe. As the cementitious material emerges from the lower end of the pipe 18 located near the top mold surface 20 of the mold cavity, under the hydrostatic pressure of the material in the pipe, it forms a stream of cementitious material 16 which spreads through the interstitial voids of the metal fiber reinforcing element 14 first in a downward movement until all such voids are completely infiltrated to the bottom of the mold cavity. The cementitious material front then progresses outwardly and upwardly through the balance of the reinforcing material and mold forcing the air out of the part as the front progresses. Addition of the material to the stand pipe is discontinued when cementitious material reaches a predetermined level or overflows the mold.

Figure 2:
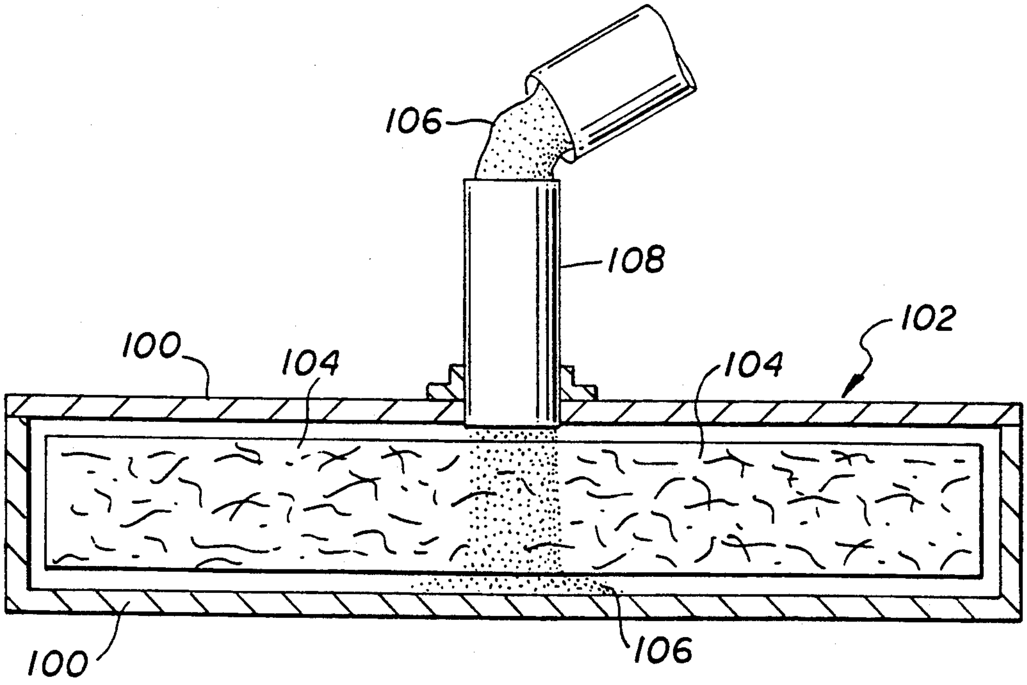
FIG. 2 is a sectional view of a molding apparatus for forming a metal fiber reinforced structure having a planar shape.

FIG. 2 illustrates a similar structural member manufactured in accordance with the invention except that the member has a planar shape. As illustrated in FIG. 2, a mold 100 has a cavity which conforms in size and shape to the desired structural member 102. A metal fiber reinforcing element 104 is placed in the mold cavity and cementitious material 106 is introduced into the mold cavity through stand pipe 108. As in FIG. 1, the cementitious material emerges from the end of the conduit 108 at the upper wall and spreads into the mold cavity infiltrating the interstitial voids of the metal fiber reinforcing element 104 in a downward and outward movement and filling the mold cavity.

While the invention has been illustrated in FIGS. 1 and 2 using a stand pipe, those skilled in the art will appreciate that the cementitious material can be pumped directly through conduit into the bottom of the form. What is desirable is that the cementitious material enter the form under pressure. The pressure can vary, but it is typically at least 0.5 psi and, more typically in the range of 0.1 to 14 psi. This pressure can be achieved by pumping, a stand pipe or by drawing the slurry into an evacuated sealed form containing the mat. A preferred stand pipe is about 6 to 40 inches above the top of the mold and 4 to 12 inches in diameter.

Figure 3:
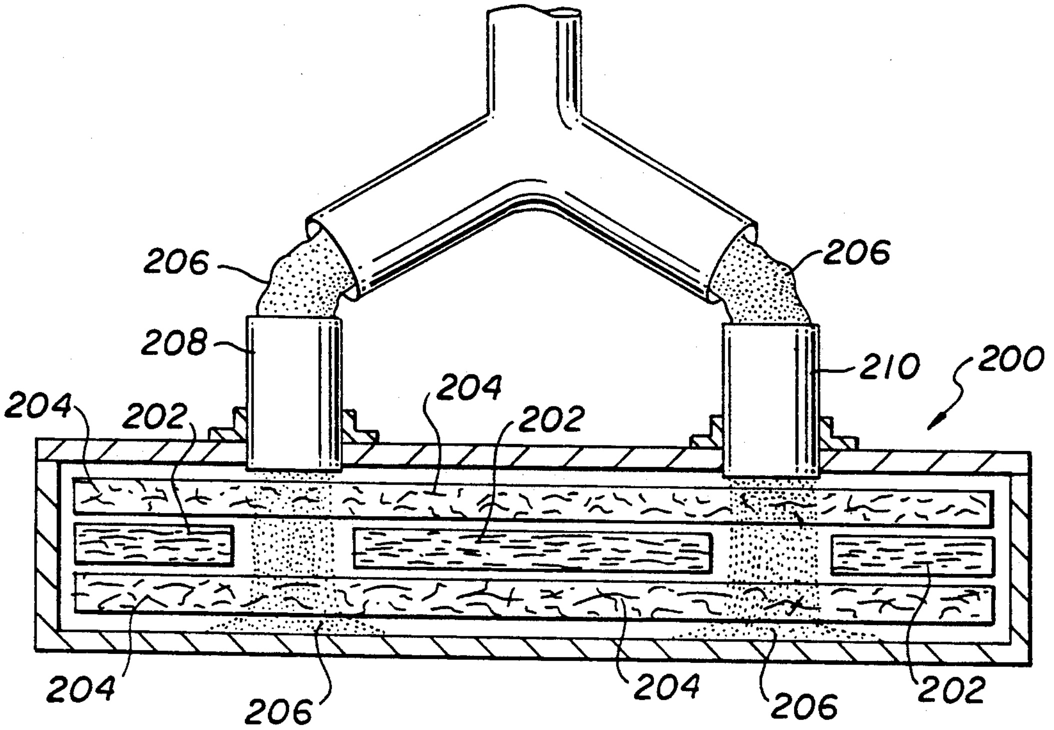
FIG. 3 is a sectional view of a molding apparatus for forming an insulated structure in which insulation is sandwiched between two layers of metal fiber reinforcing elements.

FIG. 3 illustrates a metal fiber reinforced cementitious structural member 200 manufactured in accordance with the invention wherein the reinforced structural member 200 contains sections of insulation 202 sandwiched between two metal fiber reinforcing elements 204. As illustrated in FIG. 3, the cementitious material 206 is introduced into the mold cavity through a pair of conduits 208 and 210. The cementitious material 206 issues from the end of the conduits and spreads downwardly and outwardly through the cavity infiltrating the metal fiber elements 204 and intimately surrounding the sections of insulation 202 until the mold cavity is completely filled. The tendency for the insulation material to float in the fluid cementitious material makes a rigid upper mold surface necessary.

Figure 4:
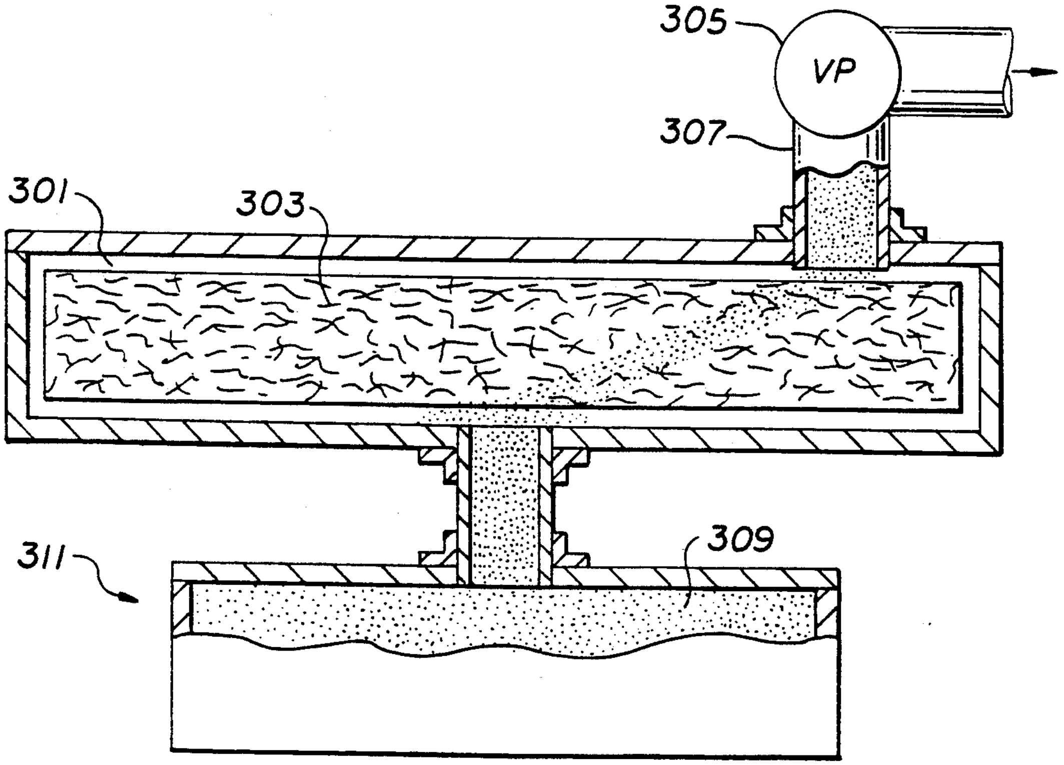
FIG. 4 is a sectional view of a molding apparatus for forming a metal reinforced structure through the use of a vacuum pump.

In another embodiment of the invention, instead of introducing the slurry to the mold through a stand pipe, a sealed mold is used and the mold is evacuated using a pump. This embodiment is illustrated in FIG. 4 where a mold cavity 301 is shown containing a metal fiber mat 303. The cavity is connected to a pump 305 by a conduit 307 whereby the cavity can be evacuated and a cementitious material 309 can be drawn into the cavity from a stock chest 311. The slurry 309 is drawn into the evacuated mold 301. This embodiment has the advantage that air is pulled out of the mold and as such, the formation of voids or airpockets in the product is avoided.

The fiber reinforcing element of the present invention can be prepared from metal fibers, glass fibers, carbon fibers, synthetic polymeric fibers such as polyolefins, polyamides, polyimides, etc. Preferably, the reinforcing element is prepared from metal fibers. The metal fibers may be composed of individual strands of metal fiber held in place by needle punching to form a unitary structure or the fibers may be individually oriented without being physically bonded to each other. Preferably, the metal fiber reinforcing elements are in the form of non-woven mats of various dimensions and densities. Typically, the reinforcing element is a non-woven mat prepared from cast metal fibers such as stainless steel, carbon steel or manganese steel. Such mats are commercially available from Ribtec, Ribbon Technology Corporation, Gahanna, Ohio under the tradename Mmat-TEC or they may be prepared by the methods and apparatus described in U.S. Pat. Nos. 4,813,472 and 4,930,565 to Ribbon Technology Corporation. These patents disclose the production of metal filamentary materials ranging from a size less than one inch up to semicontinuous fibers. The fibers are preferably about 4 to 12 inches long and more preferably about 9 inches long and have an effective diameter of about 0.002 to 0.060 inch and, preferably, about 0.010 to 0.025 inch. According to the method described in the patents, the fibers are forcibly directed and drawn into a chute where they are directed and air laid onto a conveyor and compressed into a mat. By controlling the speed of the conveyor and the extent of compression of the mat, the density of the mat can be controlled to produce mats in the range of 1.5 to 10% density by volume.

The amount of fiber in the mat and the composite may range from about 1.5 to 10% by volume. In order to incorporate more than about 10% fiber into a composite, the mat must be compressed to an extent that it cannot readily be infiltrated with a cementitious mixture. Typical composites in accordance with the invention are prepared from mats which contain about 2 to 6% by volume fiber.

The fibers may be randomly oriented in the composite or oriented to maximize the strength of the composite in a selected direction. For example, the mat fibers may be oriented parallel to the direction in which the structural member will encounter its principal tensile stress. In many applications, due to the geometry of the structural member, the fibers will assume some degree of orientation. For example, in making a panel, the fibers will be oriented generally perpendicular to the thickness or Z direction of the panel and generally parallel to the X-Y plane of the panel. Within the X-Y planes, the fibers may assume a parallel or a random alignment.

Any cementitious composition which will infiltrate the fiber mat may be used in the present invention including hydraulic and polymer cements. Mortar and concrete compositions are also useful. Representative examples of useful cements include Portland cement, calcium aluminate cement, magnesium phosphate cement, and other inorganic cements. The cementitious material must have a consistency which will allow it to easily penetrate and encapsulate the metal fibers. Preferably, it is a free flowing liquid having a ratio by weight of water to cement in the range of about 0.35 to 0.5 and, preferably, about 0.37 to 0.40.

A superplasticizing agent may be added to the slurry of the cementitious material to better enable it to infiltrate the fibers and fill the mold. A superplasticizing agent is not required but is preferred. Without the superplasticizer, more water must be added to the slurry to infiltrate the mat. Superplasticizing agents are known and have been used in flowing concrete and water-reduced, high strength concrete. See for example "Superplasticized Concrete", ACI Journal, May, 1977, pp. N6-N11 and "Flowing Concrete, Concrete Constr.", January, 1979 (pp 25-27). The most common superplasticizers are sulfonated melamine formaldehyde and sulfonated naphthalene formaldehyde. The superplasticizers used in the present invention are those which enable the aqueous cementitious slurry to fully infiltrate the packed fibers. Of those plasticizers that are commercially available, Mighty 150, a sulfonated naphthalene formaldehyde is available from ICI is preferred.

The structural members manufactured in accordance with the invention are useful in a variety of applications including panels for use as dividers and walls in buildings, beams and columns for use as load-bearing support structures, refractory shapes, and receptacles for receiving and containing various materials such as nuclear and hazardous waste.

The insulation which may be employed in the sandwich-type structure as illustrated in FIG. 3 is typically a polyurethane foam such as that used in the construction of building structures where insulation is desired or required.

The cementitious material is poured or introduced into the mold containing the sections of insulation through one or more conduits such as vertical standing pipes. The cementitious material is supplied through the opening at the top of the pipe and emerges from the opening at the bottom of the pipe where it spreads through the mold cavity and, under the force of gravity, pressure, or vacuum, is forced to penetrate the interstitial voids of the fibrous reinforcing element until the fibrous reinforcing mat is completely encapsulated, the optional insulation is completely surrounded and mold cavity is filled.

The efficiency in which the cementitious material spreads throughout the mold cavity and penetrates into the interstitial voids of the fibrous reinforcing mat is dependent upon the composition of the cementitious material, the diameter and height of the conduit and, to a degree, the area of the mold cavity to be infiltrated. The cementitious material, of course, must remain fluid for a time sufficient to allow the mold cavity and the fibrous mat to fill completely. In some instances, it may be desirable to employ more than one conduit through which the cementitious material is supplied.

Having described the invention in detail and by reference to preferred embodiments thereof, it will be apparent that modifications and variations may be made without departing from the scope of the invention.

What is claimed is:

1. A method for manufacturing a reinforced cementitious structural member having a predetermined shape and size comprising:

providing a mold having a cavity which corresponds to said shape and size of said member and having a bottom;

placing at least one permeable fibrous mat into said cavity, said permeable fibrous mat corresponding in size and shape to said cavity;

introducing through at least one vertical stand pipe, a free flowing slurry of cementitious material directly toward said bottom of said mold, said slurry of cementitious material forming a stream of cementitious material which spreads through interstitial voids of said fibrous mat in a downward movement until all said interstitial voids are completely infiltrated to said bottom of said mold cavity, wherein said cementitious material then spreads outwardly and upwardly filling said cavity and infiltrating and encapsulating said fibrous mat to form a reinforced cementitious material;

curing said reinforced cementitious material to form said reinforced cementitious structural member; and removing said cured reinforced cementitious structural member from said mold.

2. The method of claim 1 wherein said slurry is introduced into said cavity containing said fibrous mat at elevated pressure.

3. The method of claim 2 wherein said elevated pressure is provided by gravity.

4. The method of claim 1 wherein said pipe has a diameter of about 4 to 12 inches and a height of about 6 to 40 inches.

5. The method of claim 1 wherein said reinforced cementitious structural member has an arcuate shape.

6. The method of claim 1 wherein said permeable fibrous mat is a non-woven mat of reinforcing metal fibers.

7. The method of claim 6 wherein said metal fibers are cast stainless)steel, carbon steel or manganese steel.

8. The method of claim 1 wherein said reinforced cementitious structural member further comprises one or more sections of insulating material sandwiched between at least two permeable fibrous mats.

9. The method of claim 1 wherein said slurry of cementitious material has a ratio by weight of water to cement of about 0.35 to 0.5.

10. The method of claim 6 wherein said metal fibers are present in said mat in an amount of about 2 to 6% by volume.

11. The method of claim 9 wherein said cementitious material contains aggregate having a particle size of less than about 30 mesh.

12. The method of claim 11 wherein said cementitious material is a hydraulic cement, a polymer cement or a refractory cement.

13. The method of claim 1 wherein said cementitious material contains a superplasticizing agent selected from the group consisting of sulfonated melamine formaldehyde and sulfonated naphthalene formaldehyde to facilitate permeation of said cementitious material throughout said interstitial voids of said fibrous mat.

14. The method of claim 13 wherein said superplasticizing agent is sulfonated naphthalene formaldehyde.

15. The method of claim 1 wherein said step of introducing said slurry of cementitious material into said cavity includes the steps of evacuating air from said cavity and drawing said slurry into said cavity under reduced pressure.

16. In a method for manufacturing a reinforced cementitious structural member having a predetermined shape and size comprising:

providing a mold having a cavity which corresponds to said shape and size of said member and having a bottom;

placing at least one permeable fibrous mat into said cavity;

introducing a free flowing slurry of cementitious material into said cavity to form a reinforced cementitious material;

curing said reinforced cementitious material to form a reinforced cementitious structural member; and removing said cured reinforced cementitious structural member from said mold, the improvement wherein said permeable fibrous mat corresponds in shape and size to said cavity and said free flowing slurry of cementitious material is introduced through at least one vertical stand pipe directly toward said bottom of said mold, said slurry of cementitious material forming a stream of cementitious material which spreads through interstitial voids of said fibrous mat in a downward movement until all said interstitial voids are completely infiltrated to said bottom of said mold cavity, wherein said cementitious material then spreads outwardly and upwardly filling said cavity and infiltrating and encapsulating said fibrous mat to form said reinforced cementitious material which is cured to form said reinforced cementitious structural member.

* * * * *